United States Patent
Bentchev et al.

(10) Patent No.: US 8,740,461 B2
(45) Date of Patent: Jun. 3, 2014

(54) FLUID BEARING ASSEMBLY

(75) Inventors: Dimitar B. Bentchev, Norwood, MA (US); John S. Berg, Franklin, MA (US)

(73) Assignee: Carpe Diem Technologies, Inc., Franklin, MA (US)

( * ) Notice: Subject to any disclaimer, the term of this patent is extended or adjusted under 35 U.S.C. 154(b) by 2 days.

(21) Appl. No.: 13/448,502

(22) Filed: Apr. 17, 2012

(65) Prior Publication Data
US 2012/0263402 A1    Oct. 18, 2012

Related U.S. Application Data

(60) Provisional application No. 61/517,338, filed on Apr. 18, 2011.

(51) Int. Cl.
*F16C 32/06* (2006.01)
*F16C 33/10* (2006.01)
*F16C 17/00* (2006.01)

(52) U.S. Cl.
USPC .............................. 384/110; 384/100; 384/112

(58) Field of Classification Search
USPC .......... 384/100, 107, 110, 113, 128, 134, 112
See application file for complete search history.

(56) References Cited

U.S. PATENT DOCUMENTS

| | | | | |
|---|---|---|---|---|
| 2,233,840 A | * | 3/1941 | Koehler | 251/162 |
| 3,063,039 A | * | 11/1962 | Taft | 360/100.1 |
| 3,399,001 A | * | 8/1968 | Whitaker | 384/103 |
| 3,606,501 A | * | 9/1971 | Waplington | 384/110 |
| 3,754,800 A | * | 8/1973 | Johansson | 384/110 |
| 4,339,814 A | * | 7/1982 | Canino | 369/261 |
| 4,509,160 A | * | 4/1985 | Eggers | 369/269 |
| 4,710,034 A | * | 12/1987 | Tittizer et al. | 384/110 |
| 4,919,547 A | * | 4/1990 | Schwartzman | 384/110 |
| 5,397,184 A | * | 3/1995 | Murai | 384/110 |
| 6,439,774 B1 | * | 8/2002 | Knepper et al. | 384/110 |
| 6,641,513 B1 | | 11/2003 | Ward et al. | |
| 2004/0223254 A1 | * | 11/2004 | Leuthold et al. | 360/99.08 |

FOREIGN PATENT DOCUMENTS

DE            3337776 A1 *   4/1985    ............. F16C 32/06

* cited by examiner

*Primary Examiner* — Marcus Charles
(74) *Attorney, Agent, or Firm* — Kriegsman & Kriegsman

(57) ABSTRACT

A fluid bearing assembly well-suited for use as high performance, web handling roller includes a stationary inner component that extends coaxially within a rotatable outer component. The inner component includes a single conical member from which extends a narrow stem. The delivery of fluid into a nominal gap between the inner and outer components creates a tapered bearing, with the outer component capable of frictionless rotation relative to the inner component. A thrust plate is axially mounted onto the stem and is retained thereon by a threaded nut. By delivering fluid into a nominal gap between the thrust plate and the outer component, a thrust bearing is created which counterbalances the net axial force produced from the tapered bearing. Furthermore, precise adjustment of the tapered bearing air gap can be achieved through rotation of the threaded nut, thereby enabling certain performance characteristics of the fluid bearing assembly to be modified.

19 Claims, 13 Drawing Sheets

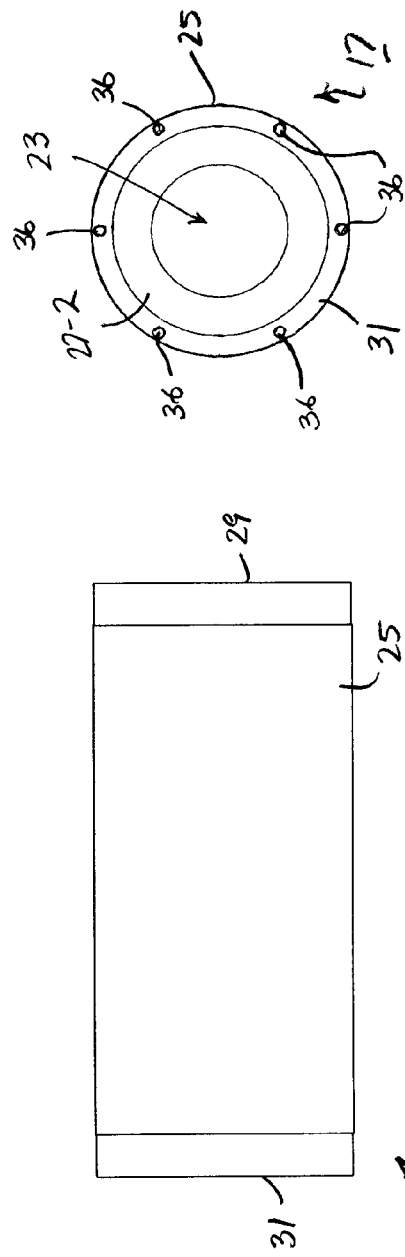
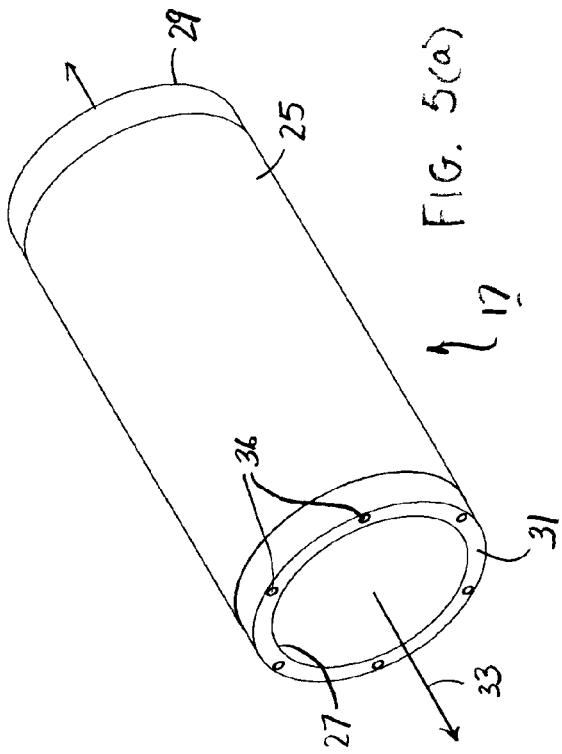
FIG. 5(c)
FIG. 5(b)
FIG. 5(a)

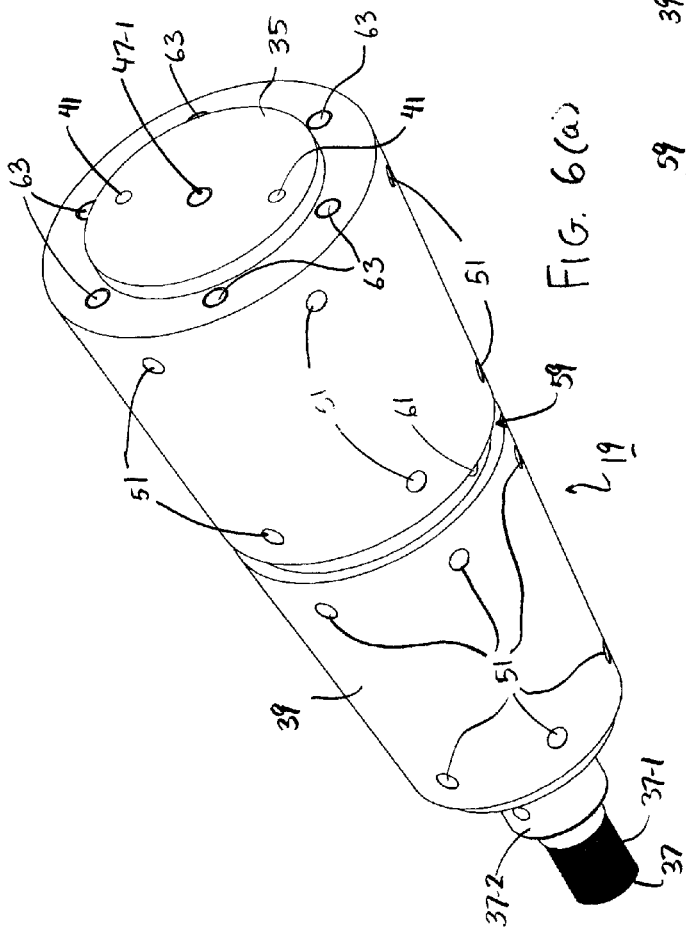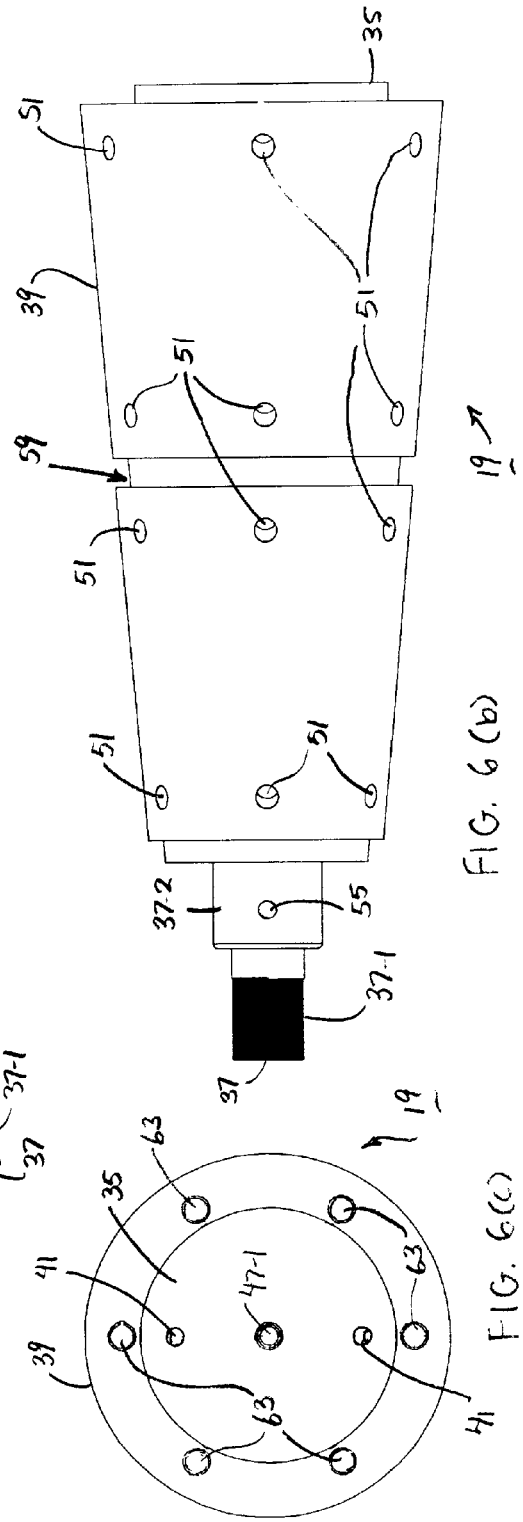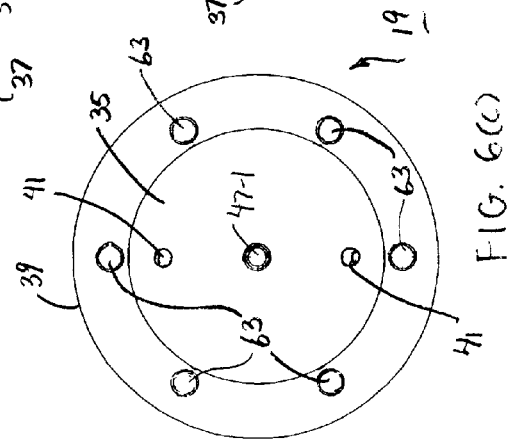

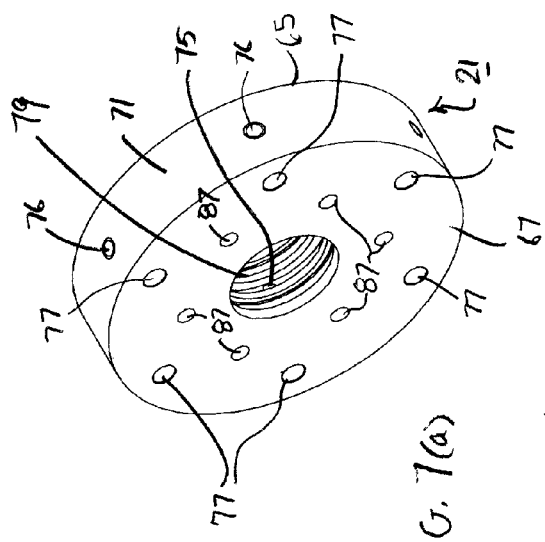
FIG. 7(a)
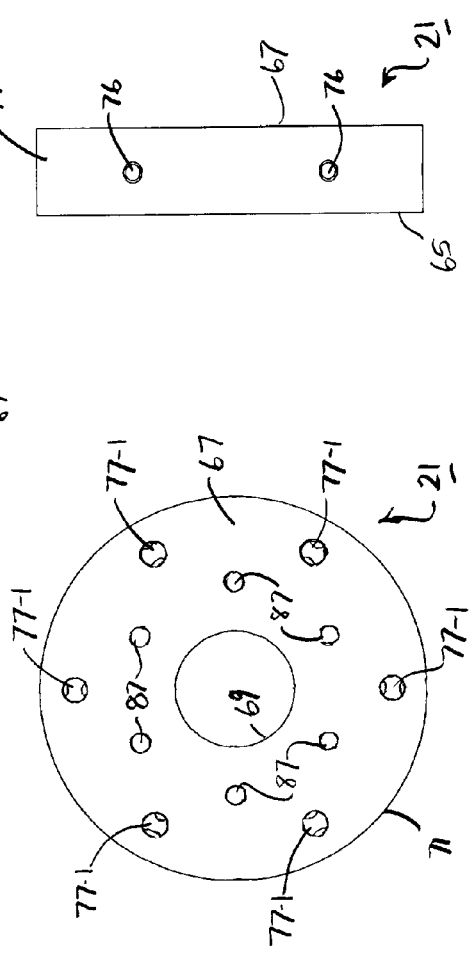
FIG. 7(c)
FIG. 7(b)

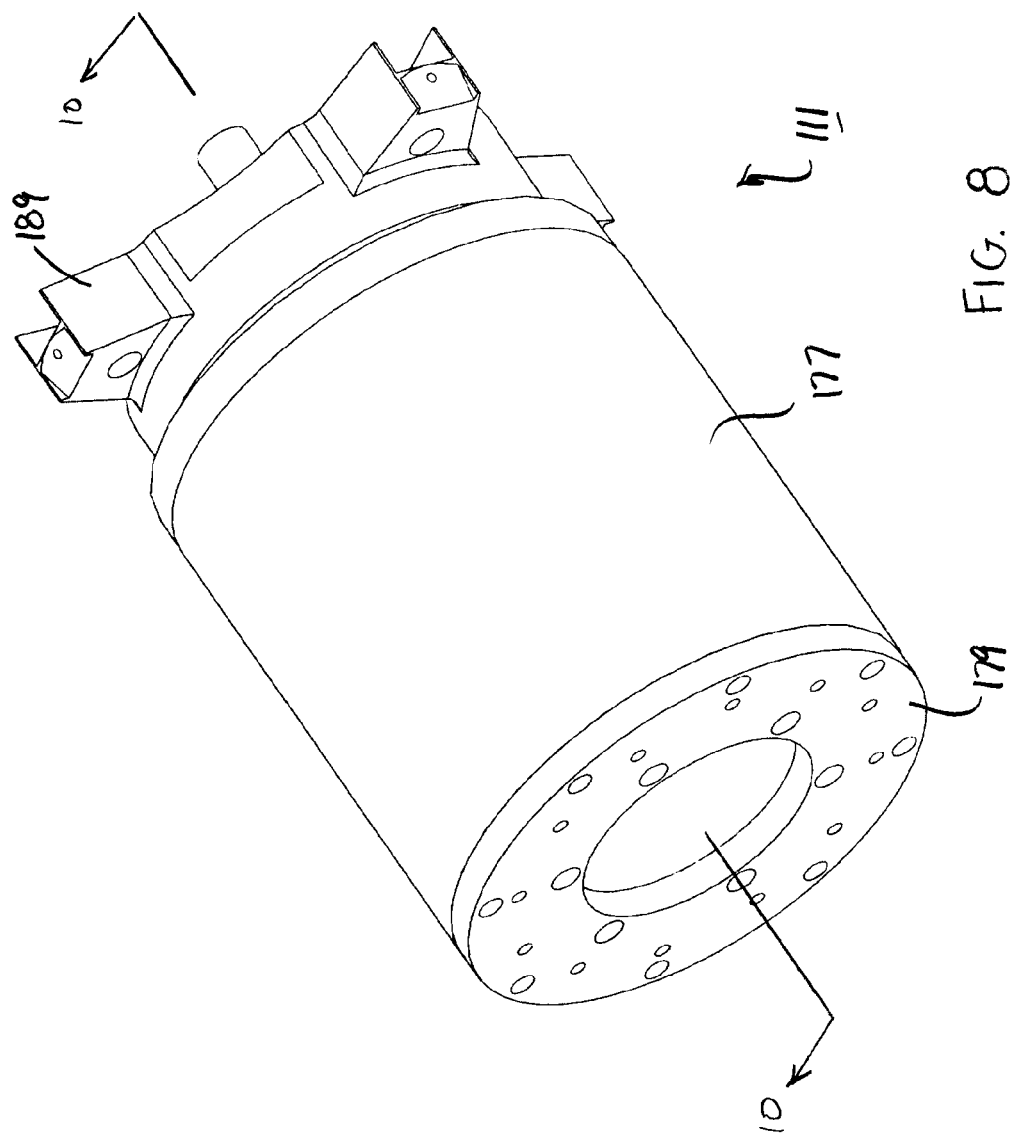

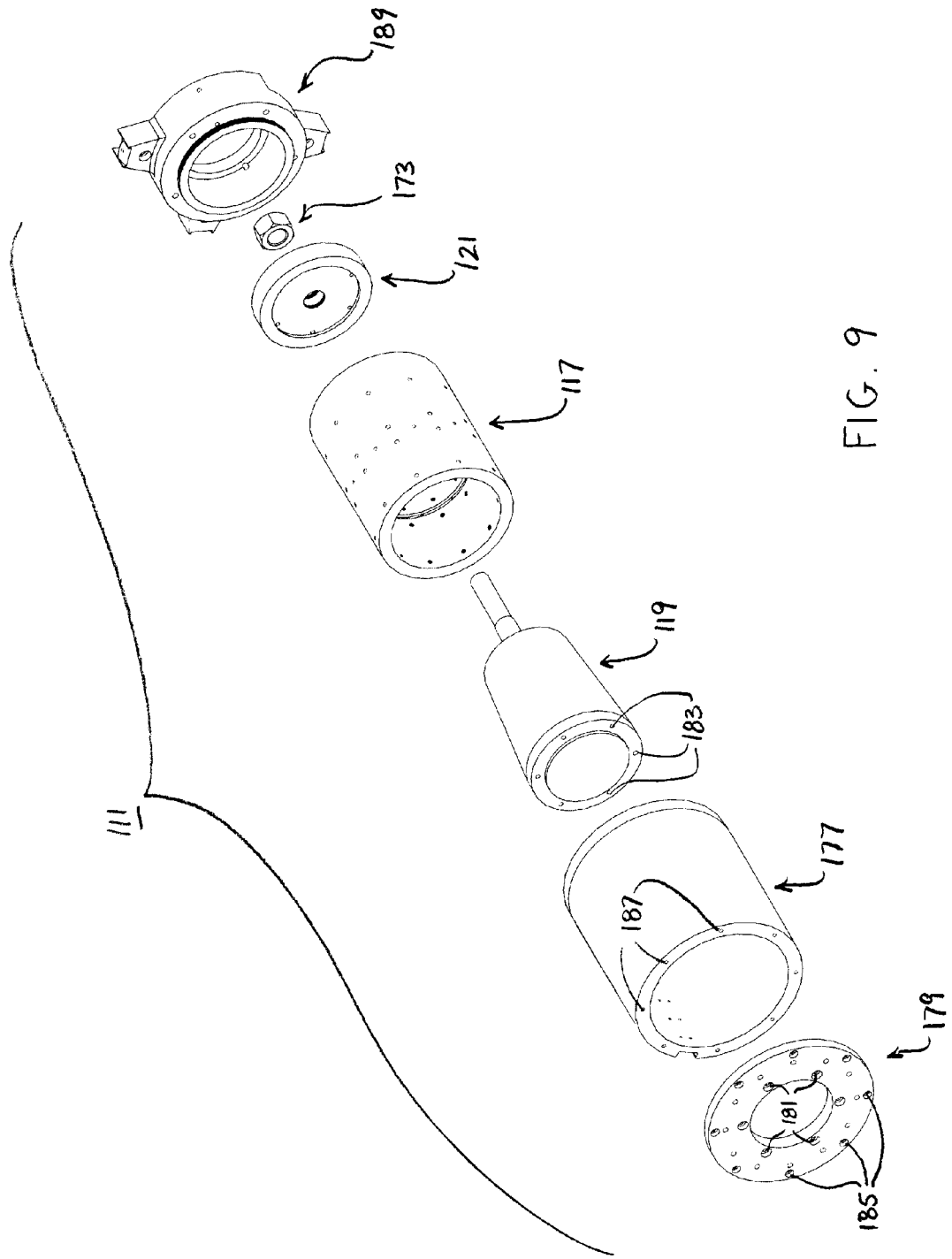

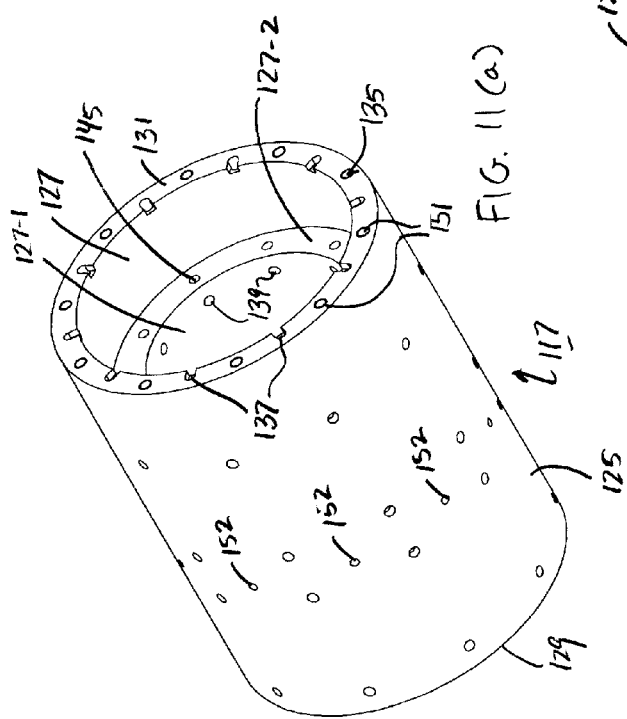
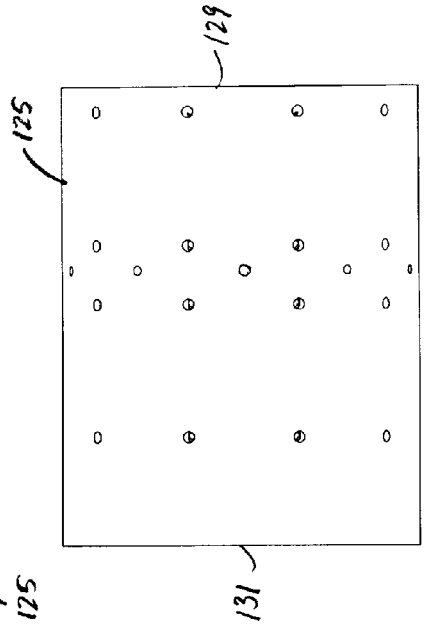
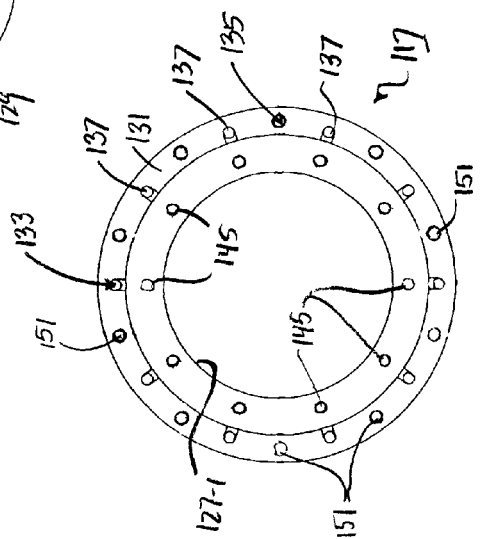

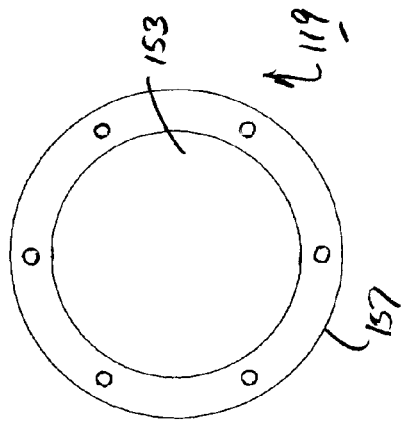
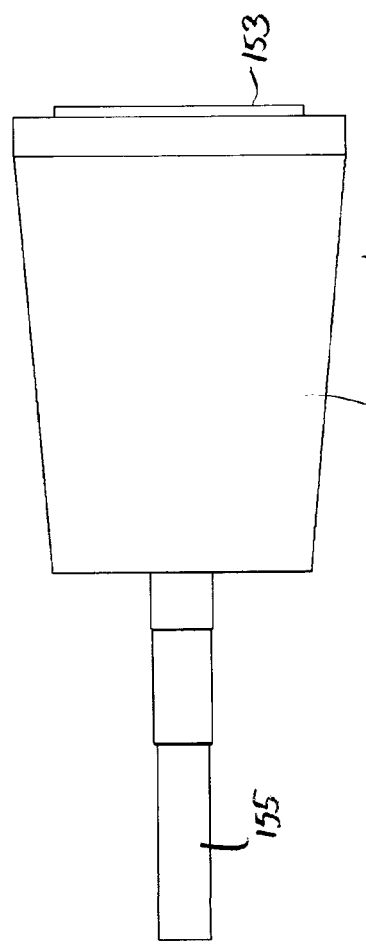
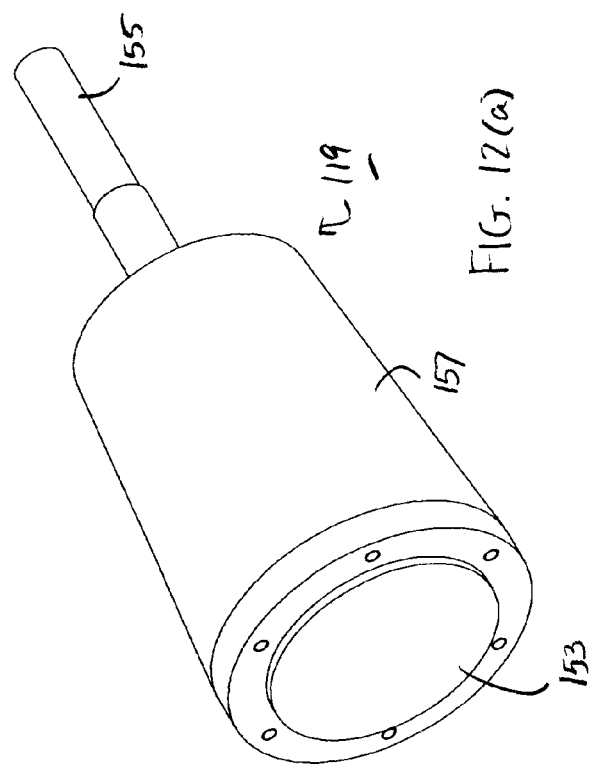

FLUID BEARING ASSEMBLY

CROSS-REFERENCE TO RELATED APPLICATIONS

The present application claims the benefit of U.S. Provisional Patent Application Ser. No. 61/517,338, which was filed on Apr. 18, 2011 in the names of John S. Berg and Dimitar Bentchev, the disclosure of which is incorporated herein by reference.

FIELD OF THE INVENTION

The present invention relates generally to machine bearings and, more particularly, to fluid film bearings that are particularly well-suited for use in low inertia, low friction rollers adapted to handle relatively high speed and fragile running webs.

BACKGROUND OF THE INVENTION

In many manufacturing applications, a continuous web is utilized as a substrate on which is deposited at least one layer, the web being commonly constructed out of a thin, flexible material, such as paper, plastic, foil, glass or a composite thereof. For example, one or more layers of film are commonly deposited, etched, embossed and/or printed onto a common web of thin, flexible material to produce, inter alia, microelectronic devices, microoptical devices and pharmaceuticals.

Web handling systems are well known in the art and are commonly used to transport, redirect or otherwise handle various types and thicknesses of webs throughout a manufacturing process. Web handling systems often rely upon an arrangement of rollers, such as nip or pinch rollers, to assist in the transport of webs between processing stations.

Throughout various manufacturing industries, higher web processing speeds are continuously sought in order to maximize productivity. However, one of the significant obstacles in improving web processing speeds is that web handling systems often rely upon commercially available rollers that experience direct solid-to-solid contact between moving parts. It is to be understood that web handling systems are required to apply a pulling force on a web to generate and maintain motion. The tension which must be applied to the web to affect its transport must be sufficient enough to overcome the internal friction experienced by the non-driven, or idler, rollers as well as the drag applied to the web during various processing steps (e.g., viscous drag resulting from the application of a coating). However, this threshold of tension that needs to be applied to the web can only be controlled to the extent that the level of friction for each mechanical roller is known.

Because the level of friction experienced by traditional mechanical rollers is not precisely determinable, excess tension is often applied to the web during transport which, in turn, can result in considerable distortion and stress to the web. With very sensitive webs, this distortion and stress can result in various types of irreversible damage, such as stress birefringence, crack propagation or, in certain circumstances, complete breakage of the web, which is highly undesirable.

Accordingly, the tension applied to a fragile running web needs to be precisely controlled to limit the likelihood of performance deterring effects. In the art, web tension control is most accurately achieved using one or more frictionless, or near frictionless, rollers in place of traditional mechanical rollers. Without internal roller friction, the web handling system can be designed to apply only the critical force that is required to transport the web through its various manufacturing processes, which is highly desirable. More specifically, by utilizing frictionless rollers, the tension applied to the web can be controlled by simply regulating the speed and torque of each motor that drives the system, thereby enabling the tension applied to the web at a certain processing station to be independently controlled by modifying the torque of the motors that drive the web through the particular processing station.

Frictionless rollers often incorporate the principal design characteristics of fluid film bearings to achieve contact-free movement between parts. A fluid film bearing, also commonly referred to in the art simply as a fluid bearing, is a machine part that is adapted to support a load. Traditionally, a fluid bearing includes two or more adjacent parts that rotate or otherwise move in relation to one another. A thin layer of liquid or gas is delivered into a nominal gap defined between opposing faces of the two or more parts. As a result, relative motion can be achieved between the parts in a contact-free manner. The lack of direct contact between moving parts of a frictionless roller is beneficial in not only limiting the tension applied by the roller to fragile webs during handling but also minimizing component wear, limiting heat generation and providing high stiffness capabilities.

One type of frictionless roller which is commonly utilized in web handling systems is constructed using the principal design features of a cylindrical air bearing. A cylindrical air bearing includes a cylindrical inner component that that extends coaxially within a cylindrical outer component, the inner and outer components being dimensioned such that a small, uniformly spaced gap is defined therebetween into which fluid can be delivered.

For example, in U.S. Pat. No. 6,641,513 to J. K. Ward, the disclosure of which is incorporated by reference, there is shown a low inertia, low friction roller, which is particularly adapted for handling relatively high speed, relatively fragile running webs. The roller comprises an inner tube that is disposed substantially coaxially about an inner tube and is rotatable with respect to the inner tube. An annular gap is defined between the inner and outer tubes and has a first portion that is supplied with a restricted flow of a pressurized compressible fluid and that is adjacent the portion of the outer tube about which the web passes. A second portion of the annular gap is circumferentially spaced from the first portion of the annular gap and communicates with a fluid exhaust passage in the inner tube. The dimensions of the annular gap are selected so that the fluid pressure in the first portion is greater than the fluid pressure in the second portion and so that the pressure of the fluid in the first portion of the annular gap will substantially balance the force exerted by the web on the outer tube as the web passes about the outer tube.

Although well-known in the art, rollers of the type described in the '513 patent that rely upon the principal design features of a cylindrical air bearing have been found to suffer from a notable drawback. Specifically, certain performance characteristics associated with such rollers, such as load capacity and stiffness, are largely defined by particular geometric properties of the roller that include, among other things, the angle and surface area of the opposing gap defining surfaces, the spacing of the gap, and the orifice size of its fluid delivery channels. Since these geometric properties are permanently defined, or fixed, upon completion of the manufacture of the individual components, adjustability of fluid bearing performance characteristics is typically unattainable once machined.

As a consequence, the degree of precision that is required in machining the various components of a cylindrical bearing roller has been found to be of critical importance. However, it is to be understood that because many of the determining dimensions are considerably small by design, the machining precision that is required cannot be reliably obtained (e.g., due to normal machining tolerances). In particular, it should be noted that fluid bearings are commonly designed with a gap spacing that is exceptionally small (often approximately 0.00015 times the radius of the inner component) in order to increase stiffness and thereby maximize performance. As a result of the challenges associated with accurately machining parts that define an exceptionally small gap, rollers of the type described in the '513 patent are commonly constructed using a larger scaling factor in order to achieve the stiffness and load capacity required to handle high speed and fragile running webs. However, this significant increase in overall roller size renders it considerably expensive to manufacture and rather difficult to integrate into relatively compact web-handling systems.

In view of the aforementioned shortcoming, frictionless rollers are also commonly constructed using the design characteristics of tapered, or non-cylindrical, fluid bearings, such as conical bearings. A conical bearing is similar to a cylindrical bearing in that a conical bearing includes an inner component that extends coaxially within an outer component, the inner and outer components being dimensioned such that a small, uniformly spaced gap is defined therebetween into which fluid can be delivered. A conical bearing differs from a cylindrical bearing in that the inner component of a conical bearing includes a generally conical portion that aligns within a corresponding conical cavity formed in the outer component. Due to the angled, or tapered, design of opposing surfaces in a conical bearing, gap spacing can be adjusted by axially displacing the conical inner component relative to the outer component.

However, it is to be understood that the wedge-shaped interrelationship between opposing surfaces of a conical bearing creates a net axial force due to the hydrodynamic action of the fluid, the net axial force resulting in the axial displacement of one component relative to the other component. In other words, the delivery of fluid between the opposing tapered surfaces that define the gap creates a net axial force that naturally separates the opposing parts.

In response thereto, conical fluid bearings typically rely upon on design symmetry to counteract the axial forces that would ordinarily result in component separation. Specifically, a conical bearing is traditionally designed to include an inner component that includes a pair of mirror-image conical members that are coaxially joined, the inner component extending axially within an outer component that is shaped to include a similarly designed cavity for receiving the inner component. As can be appreciated, the inclusion of opposing, mirror-image, conical members yields a pair of axial forces that directly counterbalance, or cancel, each other. As a result, the net axial force for a fluid bearing that includes a pair of opposing, mirror-image conical members is effectively eliminated.

Although well known in the art, conical bearings that include a pair of opposing, mirror-image conical members have been found to suffer from a number of notable shortcomings.

As a first shortcoming, the counterbalancing effect of the opposing conical portions renders such bearings incapable of gap adjustment once assembled. Stated another way, the inner component is incapable of axial displacement relative to the outer component due to the fact that the opposing conical pairs will ultimately cause the inner component to reach a position of equilibrium relative to the outer component that yields a zero net axial force.

As a second shortcoming, conical bearings of the type as described above have been found to be considerably difficult and expensive to manufacture and assemble. In particular, the dual-conical shape of the inner component typically necessitates that the outer component be constructed as multiple, separate pieces that are subsequently fused together once the inner component is properly positioned therewithin. Furthermore, this multi-stepped assembly process requires that the inner and outer components be precisely aligned.

As a third shortcoming, conical bearings of the type as described above have been found to perform poorly due to the occurrence of resonance. Specifically, due to the low viscosity of certain fluids, such as pressurized gas, resonance between components can be easily introduced into the air bearing as the fluid enters into the air bearing gap.

BRIEF SUMMARY OF THE INVENTION

It is an object of the present invention to provide a new and improved fluid film bearing.

It is another object of the present invention to provide a new and improved fluid film bearing that is particularly well-suited for use in low inertia, low friction rollers adapted to handle relatively high speed and fragile running webs.

It is yet another object of the present invention to provide a fluid film bearing of the type described above that includes an inner component that extends coaxially within an outer component, the inner and outer components being dimensioned such that a small, uniformly spaced air gap is defined therebetween into which fluid can be delivered.

It is still another object of the present invention to provide a fluid film bearing of the type described above that allows for acute adjustability of the size of the air gap between inner and outer components after assembly.

It is yet still another object of the present invention to provide a fluid film bearing of the type described above that experiences limited resonance.

It is another object of the present invention to provide a fluid film bearing of the type described above that has a limited number of parts, is inexpensive to manufacture and is easy to use.

Accordingly, as a principal feature of the present invention, there is provided a fluid bearing assembly, comprising (a) an outer component having a main longitudinal axis, the outer component being shaped to define an interior cavity, (b) an inner component disposed within the interior cavity and extending in a coaxial relationship relative to the outer component, the inner and outer components together defining a first air gap, and (c) a thrust plate axially coupled to the inner component, the thrust plate and the outer component together defining a second air gap, (d) wherein each of the first and second air gaps is adapted to receive a fluid, the delivery of the fluid into the first air gap creating a tapered fluid bearing between the inner and outer components, the delivery of fluid into the second air gap creating a fluid thrust bearing between the thrust plate and the outer component.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts:

FIGS. 5(a)-(c) are top perspective, front and left end views, respectively, of the outer component shown in FIG. 2;

FIGS. 6(a)-(c) are bottom perspective, front and right end views, respectively, of the inner component shown in FIG. 2;

FIGS. 7(a)-(c) are right end perspective, right end and front views, respectively, of the thrust plate shown in FIG. 2;

FIG. 8 is a front perspective view of a second embodiment of a fluid bearing assembly constructed according to the teachings of the present invention;

FIG. 9 is an exploded, perspective view of the fluid bearing assembly shown in FIG. 8;

FIGS. 11(a)-(c) are right end perspective, rear and right end perspective views, respectively, of the outer component shown in FIG. 9;

FIGS. 12(a)-(c) are front perspective, rear and left end views, respectively, of the inner component shown in FIG. 9.

DETAILED DESCRIPTION OF THE INVENTION

Construction of Fluid Bearing Assembly 11

Figure 1:
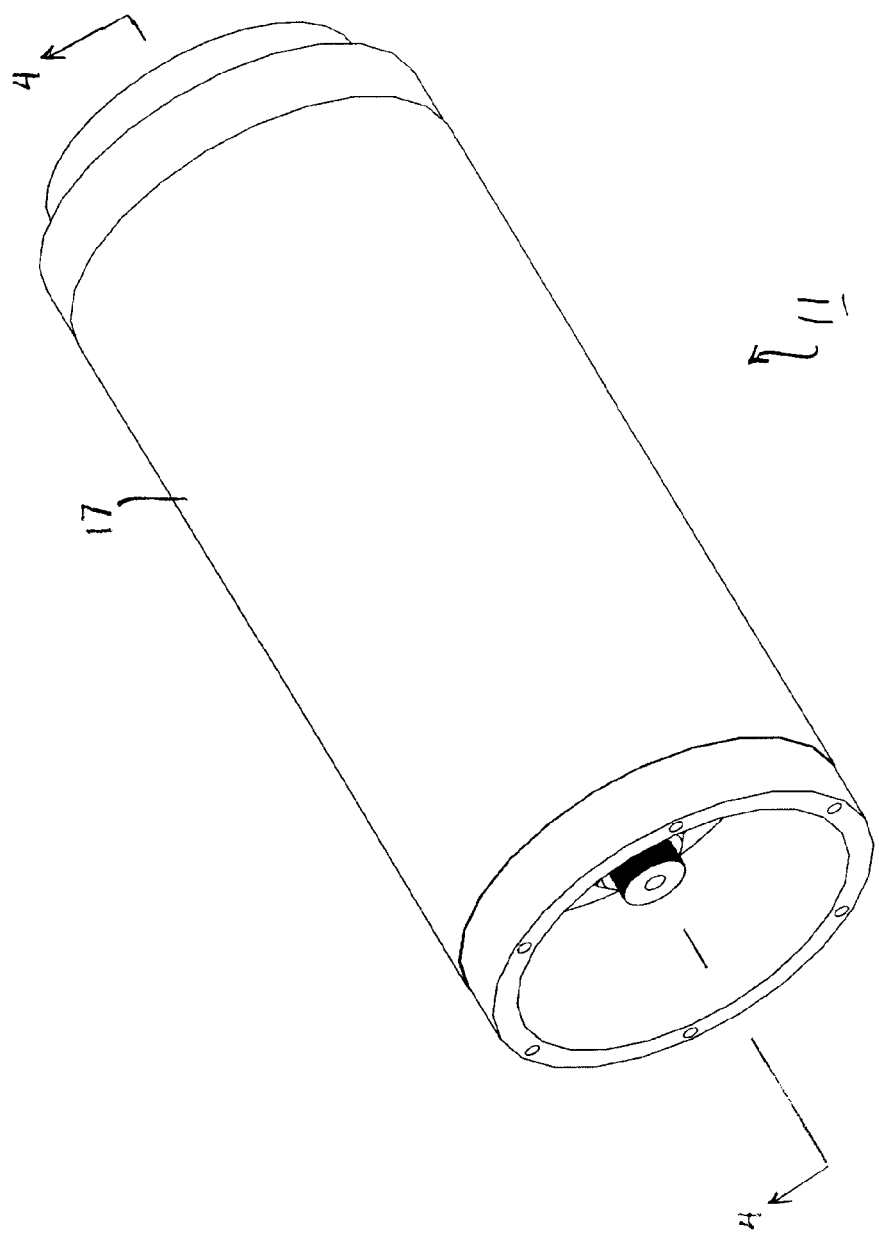
FIG. 1 is a front perspective view of a first embodiment of a fluid bearing assembly constructed according to the teachings of the present invention.

Referring now to FIGS. 1-4, there is shown a first embodiment of a fluid bearing assembly that is constructed according to the teachings of the present invention, the fluid bearing assembly being identified generally by reference numeral 11. In use, fluid bearing assembly 11 can be integrated into, inter alia, a high performance roller designed to transport, redirect or otherwise handle a continuous web of material.

As will be described further in detail below, fluid bearing assembly 11 comprises a tapered fluid bearing, or tapered bearing, 13 adapted to support radial and axial loads as well as a fluid thrust bearing, or thrust bearing, 15 adapted to support axial loads. In this manner, critical performance characteristics for tapered bearing 13 can be easily controlled through regulation of thrust bearing 15 and, as such, serves as a principal novel feature of the present invention.

As can be seen, fluid bearing assembly 11 comprises an outer component 17, an inner component 19 extending coaxially within outer component 17, and a thrust plate 21 mounted on inner component 19 and extending in a generally orthogonal relationship relative thereto. Together, outer component 17 and inner component 19 form tapered bearing 13. Accordingly, by applying a fluid between mating surfaces, outer component 17 is able to rotate axially about inner component 19 in a frictionless manner (i.e., without direct contact). In a similar capacity, outer component 17 and thrust plate 21 form thrust bearing 15. Accordingly, by applying a fluid between mating surfaces, thrust plate 21 applies an axial force onto outer component 17 that is designed to counteract the opposing axial force applied onto inner component 19 by tapered bearing 13 due to the hydrodynamic action of the fluid, as will be described further below.

For purposes of simplicity, fluid bearing assembly 11 will be described as utilizing a thin layer of compressed air to create the frictionless contact between opposing surfaces in both tapered bearing 13 and thrust bearing 15. However, it is to be understood that alternative types of fluids, such as oils or other similar types of liquids, could be used in place of compressed air without departing from the spirit of the present invention.

Referring now to FIGS. 3 and 5(a)-(c), outer component 17 is in the form of a generally cylindrical roller, or drum, that is hollowed out along its length so as to define an interior cavity 23 which is dimensioned to receive both inner component 19 and thrust plate 21. Outer component 17 is preferably constructed of rigid and durable material, such as metal, and is shaped to include an exposed outer surface 25, a multi-faced inner surface 27, an open first end 29, an open second end 31 and a main longitudinal axis 33.

Exposed outer surface 25 is preferably rounded and smooth so as to provide outer component 17 with a generally circular profile in transverse cross-section. In this manner, outer surface 25 serves as a desirable contact surface for handling continuous webs of potentially fragile material, as will be discussed further below.

Figure 3:
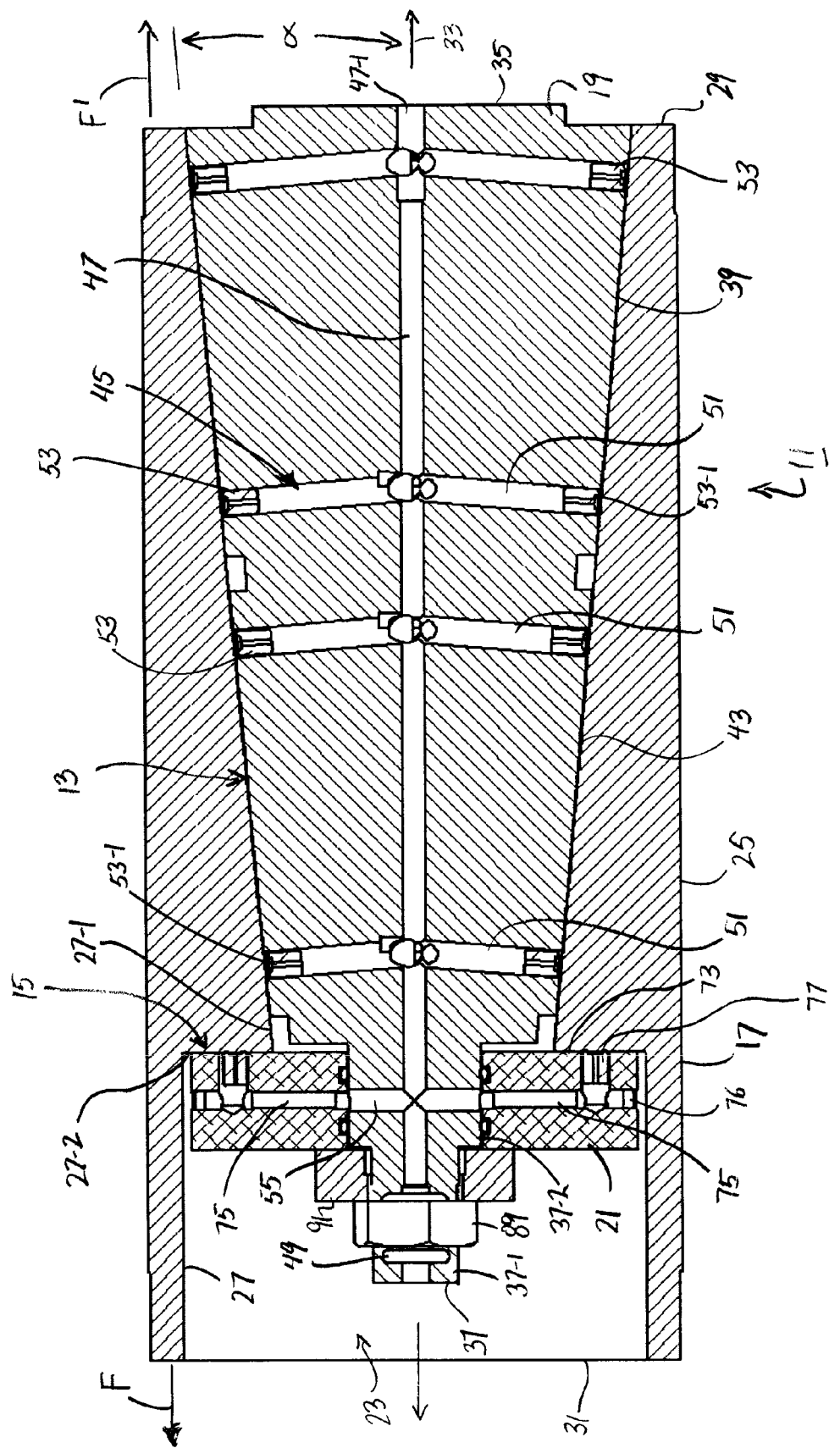
FIG. 3 is an assembled, section view of the fluid bearing assembly shown in FIG. 2, taken along lines 3-3.

As seen most clearly in FIG. 3, inner surface 27 of outer component 17 is precisely machined to define a single uniformly tapered, or conical, portion 27-1 that is formed in first end 29 and extends inward the majority of the length of outer component 17. Preferably, conical portion 27-1 extends at an angle $\alpha$ relative to longitudinal axis 33 that is approximately 5 degrees (or, more broadly, falls in the range of approximately 0.5 degrees and 10 degrees). It should be noted that the particular value of angle $\alpha$ serves as a critical parameter in determining the adjustability of bearing assembly 11. Specifically, angle $\alpha$ defines the numerical mechanical advantage for improving resolution in setting the gap in tapered bearing 13, the mechanical advantage being represented herein as $1/\sin \alpha$. In other words, axial displacement of inner component 19 relative to outer component 17 by a factor of 0.001 inches results in less than 0.0001 inches of change in the gap spacing for tapered bearing 13. As a result, the gap spacing for tapered bearing 13 can be regulated with very precise control, which is highly advantageous.

Inner surface 27 of outer component 17 is also precisely machined to define an annular, radial portion 27-2 that is adjacent to conical section 27-1, as shown in FIGS. 3 and 5(c). As can be seen, annular surface 27-2 is spaced slightly in from second end 31 and extends in an orthogonal relationship relative to longitudinal axis 33. As noted briefly above, annular surface 27-2 serves as the facing upon which thrust plate 21 applies an axial force to counteract the opposing axial force created from tapered bearing 13, thereby retaining inner component 19 coaxially within outer component 17.

Figure 4:
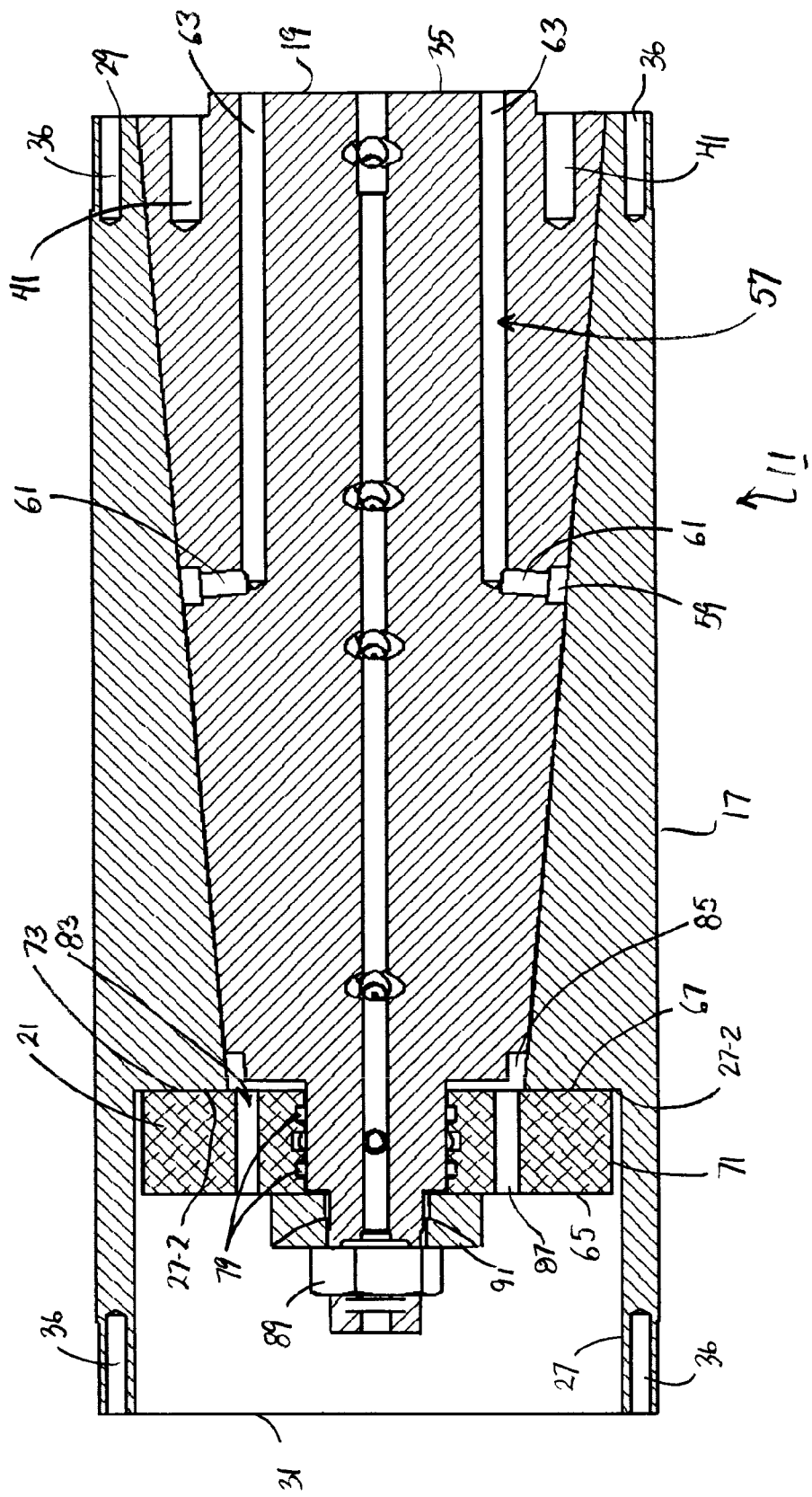
FIG. 4 is an assembled, section view of the fluid bearing assembly shown in FIG. 1, taken along lines 4-4.

As seen most clearly in FIGS. 4, 5(a) and 5(c), tapped holes 36 are preferably drilled or otherwise formed into first and second ends 29 and 31. As will be described further below, each hole 36 is dimensioned to fittingly receive a complementary coupling element (not shown) that can be used to, inter alia, balance outer component 17 or enable additional components to be secured thereto.

Referring now to FIGS. 3 and 6(a)-(c), inner component 19 is in the form of a generally solid, single conical member that is similarly constructed of a rigid and durable material, such as metal. As can be seen, inner component 19 includes a first end 35, a second end 37 and a tapered outer surface 39.

As seen most clearly in FIGS. 4, 6(a) and 6(c), a pair of longitudinal bores 41 partially extends into first end 35 of inner component 19. As can be appreciated, bores 41 are dimensioned to receive fastening elements (not shown) that enable inner component 19 to be secured to another element (not shown). In this manner, inner component 19 can be rendered stationary during normal operation of bearing assembly 11, and thereby function as a stator, by securing inner component 19 to a fixed element. In this situation, outer component 17 would function as a rotor that is adapted to freely rotate about main longitudinal axis 33.

As seen most clearly in FIGS. 3, 6(a) and 6(b), second end 37 has a generally cylindrical shape that varies in diameter along certain regions, thereby providing second end 37 with a stepped configuration in transverse cross-section. Specifically, second end 37 includes a narrow, fine pitch threaded portion, or stem, 37-1 at is free end and a widened portion 37-2 immediately adjacent thereto that serves as a support surface for thrust plate 21, as will be described further below.

Preferably, tapered outer surface 39 is precisely machined to extend relative to longitudinal axis 33 at the same general angle α that conical portion 27-1 of outer component 17 lies, as shown in FIG. 3. Dimensionally, inner component 19 is preferably designed so that a minimal, uniform air gap 43 is defined between conical portion 27-1 of outer component 17 and outer surface 39 of inner component 19 when bearing assembly 11 is fully assembled, as shown in FIG. 3.

As noted briefly above, the spacing of air gap 43 is considerably small (approximately 4 microns) and can be precisely varied by longitudinally (i.e., axially) displacing inner component 19 relative to outer component 17, with the spacing of air gap 43 increasing by less than an 0.0001 inch for every 0.001 inches that first end 35 of inner component 19 is moved away from first end 29 of outer component 17. Similarly, it is to be understood that the spacing of air gap 43 decreases at the same factor as inner component 17 is longitudinally displaced in the opposite direction (i.e., towards second end 31 of outer component 17).

The introduction of pressurized air into air gap 43 enables outer component 17 to rotate relative to inner component 19 in a frictionless manner. As seen most clearly in FIG. 3, the pressurized air is delivered into air gap 43 through a fluid delivery network 45 that is drilled or otherwise formed into inner component 19. As can be seen, fluid delivery network 45 includes a main channel 47 that extends longitudinally therethrough. The main channel 47 is shaped to define an inlet 47-1 at first end 35 that is adapted to receive the supply of pressurized air. A sealing cap 49 is mounted onto second end 37 to prevent air from escaping therethrough.

A plurality of spaced apart, radial branches 51 is drilled or otherwise formed into inner component 19 in fluid communication with main channel 47. As can be seen, each branch 51 extends radially away from main channel 47 to a point along outer surface 39. In this manner, a thin layer of pressurized air is delivered into air gap 43 in a uniformly distributed matter, which is highly desirable.

A restrictor 53 is disposed in each radial branch 51 so as to lie flush against outer surface 39 and serves, inter alia, to restrict the flow of air therethrough. Each restrictor 53 is generally formed as annular nozzle that is constructed out of suitable material, such as metal (e.g., brass) or jewel (e.g., ruby). Each restrictor 53 defines a central orifice 53-1 of limited diameter (e.g., in the range of 0.0004 inches to 0.016 and preferably 0.003 inches) to increase the pressure of air delivered therethrough. Although restrictors 53 are represented herein as separately constructed components that are inserted into branches 51, it is to be understood that each branch 51 could be alternatively machined to include a reduced diameter orifice at its free end without departing from the spirit of the present invention.

In addition, a pair of radial channels 55 is drilled or otherwise formed into second end 37 in fluid communication with main channel 47. Specifically, radial channels 55 are located within widened portion 37-2 of inner component 19 and extend radially out in an externally communicable fashion to supply pressurized air to thrust bearing 15, as will be described further below.

Pressurized air delivered into air gap 43 is released through a fluid exhaust network 57 that is drilled or otherwise formed into inner component 19. Specifically, as seen most clearly in FIGS. 4 and 6(a)-(c), a circumferential exhaust groove 59, generally rectangular in cross-section, is formed into tapered outer surface 39 of inner component 19 at the approximate midpoint between first end 35 and second end 37. With inner component 19 properly positioned within interior cavity 23, groove 59 is rendered in fluid communication with air gap 43.

A plurality of radial exhaust channels 61 is drilled or otherwise formed into groove 59 in communication therewith, each channel 61 extending slightly radially in from outer surface 39 of inner component 19. In turn, an equidistantly spaced array of longitudinal exhaust channels 63 is drilled or otherwise formed in first end 35 of inner component 19, each longitudinal exhaust channel 63 extending into fluid communication with a corresponding radial exhaust channel 61. In this capacity, pressurized air within air gap 43 is exhausted to ambient conditions through channels 61 and 63 and, in turn, out through first end 35.

As seen most clearly in FIGS. 2-4 and 7(a)-(c), thrust plate 21 is a unitary, annular member that is constructed of a rigid and durable material, such as metal, and includes a precisely machined, flat top surface 65, a flat bottom surface 67, an inner surface 69 and an outer surface 71. As referenced briefly above, thrust plate 21 is axially mounted on widened portion 37-2 of inner component 19, with thrust plate 21 dimensioned so that a minimal, uniform air gap 73 is defined between bottom surface 67 of thrust plate 21 and annular surface 27-2 in outer component 17 (this spacing of air gap 73 being approximately 25 microns). As will be described further in detail below, the delivery of pressurized air into air gap 73 results in the application of an axial force to inner component 19 that counterbalances the opposing axial force applied to inner component 19 from tapered bearing 13, which serves as a principal novel feature of the present invention.

As seen most clearly in FIGS. 3 and 7(a), thrust plate 21 is drilled or otherwise formed to include a plurality of radial branches 75 that is located between top and bottom surfaces 65 and 67, each branch 75 extends radially out from inner surface 69. A seal 76 is fittingly inserted into each radial branch 75 and lies generally flush with outer surface 71, each seal 76 serving to prevent passage of air therethrough.

A plurality of restrictors 77 is in turn mounted flush into bottom surface 67, each restrictor 77 being disposed in fluid communication with a corresponding radial branch 75. As seen in FIGS. 7(a) and 7(b), restrictors 77 are arranged in a circular array, with adjacent restrictors 77 spaced apart in a fixed angular relationship. Preferably, restrictors 77 are similar in construction to restrictors 53 and similarly serve to restrict the flow of air therethrough, each restrictor 77 defining a central orifice 77-1 that is preferably 0.004 inches in diameter.

With thrust plate 21 properly mounted on widened portion 37-2, each radial branch 75 in thrust plate 21 aligns in direct fluid communication with a corresponding channel 55 in inner component 19, as shown in FIG. 3. As such, a portion of the pressurized air delivered into inlet 47-1 travels the majority of the length of main channel 47, passes through radial channels 55 in widened portion 37-2, continuous through radial branches 75 in thrust plate 21 and exits out through restrictors 77. Consequently, a thin layer of pressurized air is delivered into air gap 73 defined between bottom surface 67 of thrust plate 21 and annular surface 27-2 in outer component 17.

Figure 2:
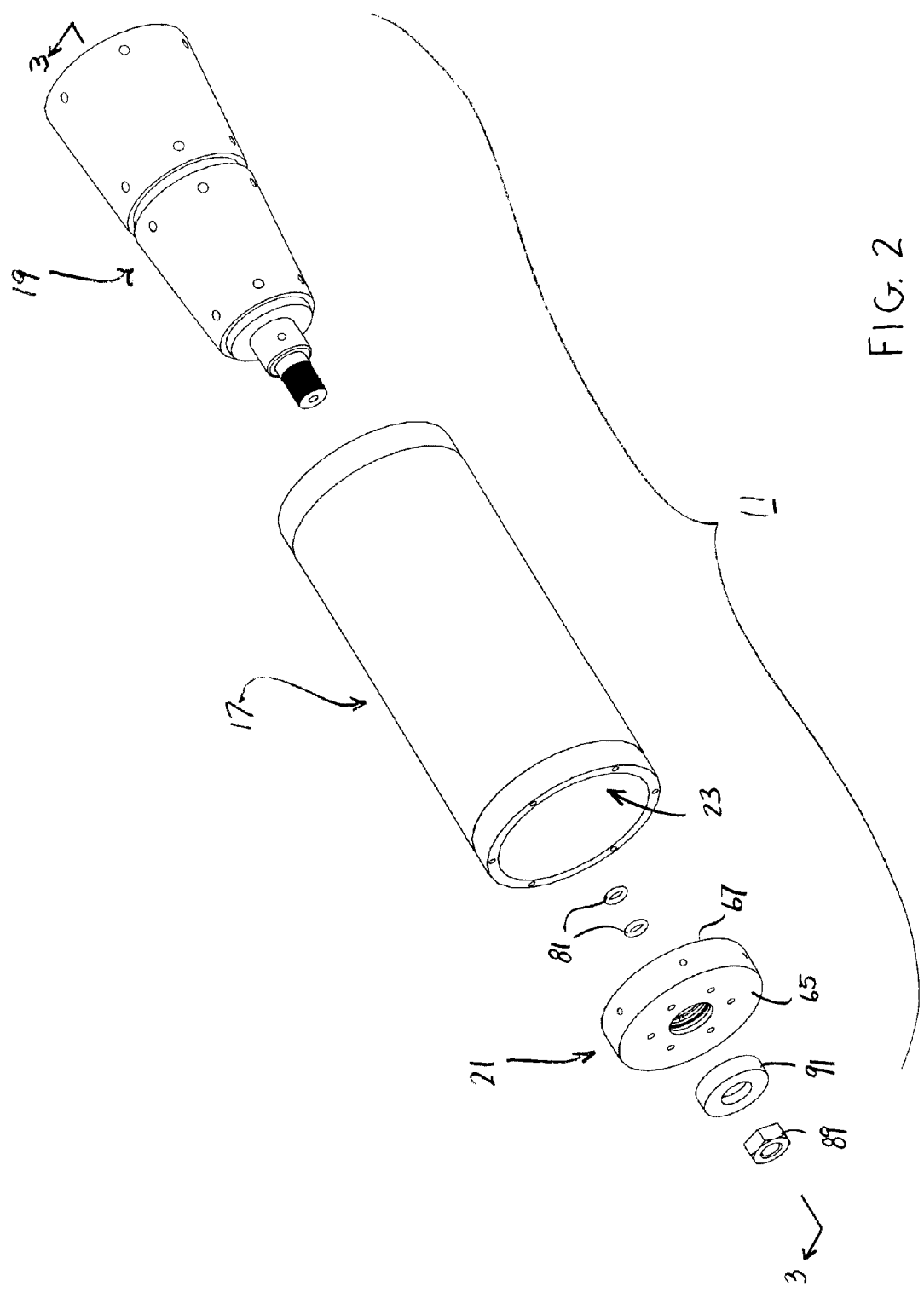
FIG. 2 is an exploded perspective view of the fluid bearing assembly shown in FIG. 1.

As seen most clearly in FIGS. 4 and 7(a), a pair of annular grooves 79 is formed into inner surface 69 on opposing sides of radial branches 75. An O-ring 81, each of which is clearly visible in FIG. 2, is fittingly disposed within each annular groove 79 and serves as a seal between thrust plate 21 and inner component 19, thereby enabling air to be delivered efficiently from radial channels 55 in inner component 19 to radial branches 75 in thrust plate 21.

In a similar capacity to tapered bearing 13, thrust bearing 15 is provided with a fluid exhaust network 83 to release pressurized air within air gap 73 into ambient conditions. Specifically, as seen most clearly in FIGS. 4, 7(a) and 7(b), a circumferential exhaust notch 85, generally rectangular in cross-section is formed into tapered outer surface 39 of inner component 19 at its innermost end. In addition, a circular array of longitudinal channels 87 is drilled or otherwise formed through the entirety of thrust plate 21, each channel 87 extending in fluid communication with notch 85. As a result, pressurized air within air gap 73 is exhausted to ambient conditions through channels 87 in thrust plate 21 as well as through the annular space that is defined between outer surface 71 of thrust plate 21 and inner surface 27 of outer component 17.

As noted above, annular thrust plate 21 is axially mounted on widened portion 37-2 of inner component 19. A nut 89 is threadingly mounted onto stem 37-1, with a two-piece spherical washer 91 disposed firmly between nut 89 and top surface 65 of thrust plate 21. As such, nut 89 and washer 91 serve to retain thrust plate 21 mounted on widened portion 37-2 once air is delivered into thrust bearing air gap 73.

Operation of Fluid Bearing Assembly 11

Referring now in particular to FIG. 3, fluid bearing assembly 11 is designed to operate in the following manner. Specifically, as noted above, the introduction of pressurized air into inlet 47-1 results in its ultimate delivery into both conical bearing air gap 43 as well as thrust bearing air gap 73.

As noted above, the delivery of pressurized air into conical bearing air gap 43 enables outer component 17 to rotate axially about inner component 19 in a frictionless manner, which is highly desirable. In this manner, outer component 17 is adapted to support radial loads on exposed outer surface 25 without experiencing direct solid-to-solid contact with inner component 19.

However, due to the application of pressurized air between the opposing wedged-shaped surfaces that define tapered bearing 13, the hydrodynamic action of the fluid creates opposing axial forces between inner component 19 and outer component 17 that tends to separate, or disassemble, the two components, which is highly undesirable. As shown in FIG. 3, the net axial force created from tapered bearing 13 results in outer component 17 being urged away from fixedly mounted inner component, or stator, 19 in the direction as represented by arrow F.

Traditionally, the net axial force created from a conical bearing is counterbalanced through the use of a second set of opposing wedged-shaped surfaces that are symmetrically arranged relative thereto. As noted above, this arrangement of using a pair of opposing, mirror-image conical members creates a number of notable shortcomings including, but not limited to, considerable manufacturing complexity and cost, which are highly undesirable. By comparison, the single conical construction of fluid bearing assembly 11 allows for its construction and assembly in a relatively simple and inexpensive manner.

In the present invention, thrust bearing 15 is utilized to counterbalance the net axial force created from tapered bearing 13. Specifically, the application of pressurized air within thrust bearing air gap 73 creates a net axial force between outer component 17 and thrust plate 21. Because nut 89 and washer 91 together retain thrust plate 21 axially mounted onto widened portion 37-2 of stationary inner component 19, the net axial force created from thrust bearing 15 results in outer component 17 being urged away from fixedly mounted inner component 19 in the direction represented by arrow F'. As such, it is apparent that net axial force created from thrust bearing 15 serves to counterbalance the opposing axial force applied to outer component 17 from tapered bearing 13, which is highly desirable.

It should be noted that spherical washer 91 limits the opposing axial force applied to outer component 17 from thrust bearing 15 along an axial path regardless of any manufacturing thickness or planarity variations which may exist. Furthermore, O-rings 81 enable thrust plate 21 to be more loosely mounted on widened portion 37-2 so that the functionality of thrust bearing 15 is not over constrained and can operate properly.

As a principal feature of the present invention, it is to be understood that the spacing of conical bearing air gap 43 can be adjusted with very precise control. This adjustability of air gap 43 enables certain performance characteristics of fluid bearing assembly 11, such as stiffness and load capacity, to be acutely modified for use in specified applications, which is highly desirable.

The adjustment of conical bearing air gap 43 is achieved simply through the axial adjustment of nut 89 on stem 37-1. Specifically, tightening of nut 89 serves to reduce thrust bearing air gap 73 and, as a consequence, similarly reduce conical bearing air gap 43 due to the counterbalanced relationship between bearings 13 and 15. Similarly, loosening of nut 89 serves to increase thrust bearing air gap 73 and, as a consequence, similarly increase conical bearing air gap 43. As can be appreciated, due to the very fine pitch thread on stem 37-1 as well as the $1/\sin\alpha$ mechanical advantage referenced above, conical bearing air gap 43 can be adjusted with very high precision, which is a principal object of the present invention.

Accordingly, although the dimensional and geometric aspects of outer component 17, inner component 19, thrust plate 21, and restrictors 53 and 77 largely determine the initial performance characteristics of bearing assembly 11 and are therefore selected carefully, the ability to adjust the spacing of conical bearing air gap 43 through rotation of nut 89 enables the performance characteristics of bearing assembly 11 to be modified at any time after assembly (e.g., to compensate for machining tolerances or particular applications). For example, the stiffness of tapered bearing 13 is inversely proportional to air gap 43 and, as such, can be easily adjusted through rotation of nut 89. As another example, the maximum load capacity of tapered bearing 13 is a function of air bearing pressure and the surface area of mating surfaces and, as such, can be easily adjusted through rotation of nut 89.

It should be noted that maximum stiffness of tapered bearing 13 is achieved when choked flow conditions through restrictors 53 and 77 are met. With pressurized air used as the bearing medium, the flow rate into fluid bearing assembly 11 is determined by the supply pressure. If a radial load is applied onto outer component 17 that results in a doubling of conical bearing air gap 43 on one side and a halving of air gap 43 on the other, a restoring force is produced as if these were static volumes that were modified according to the principles of Boyle's law. This effect thereby illustrates the value of establishing a nominal air gap 43 between constant, or fixed, surface areas. In other words, utilizing a nominal air gap 43 creates a greater proportional change in volume and, as a consequence, a greater restoring force per displacement (i.e., stiffness).

It should be also noted that single conical construction of bearing assembly 11 results in less resonance than traditional bearing assemblies that rely upon a bi-conical design to compensate for net axial forces between angled surfaces, which is highly desirable. Lower resonance is achieved because tapered bearing 13 and thrust bearing 15 do not have a natural frequency that is centered in the same location. As a result, bearings 13 and 15 cannot act in phase and thus damping is effectively achieved.

It is to be understood that the high performance characteristics of fluid bearing assembly 11 renders it well-suited for a wide variety of applications. In particular, fluid bearing assembly 11 is particularly well-suited for integration into a high speed, high load, high precision roller that can be used, among other things, to transport, redirect or otherwise handle a continuous web of relatively fragile material (e.g., of the type used as a substrate in the manufacture of microelectronics, microoptical devices, and pharmaceuticals).

Alternate Embodiments and Design Modifications

As referenced briefly above, the particular construction of fluid bearing assembly 11 is intended to be merely exemplary and those skilled in the art shall be able to make numerous variations and modifications to it without departing from the spirit of the present invention. All such variations and modifications are intended to be within the scope of the present invention as defined in the appended claims.

For example, inner component 19 is represented herein as having a generally conical design to allow for air gap adjustability. However, it is to be understood that inner component 19 could be constructed in alternative shapes without departing from the spirit of the present invention. Specifically, although inner component 19 is represented herein as having a uniformly tapered outer surface 39, it is to be understood that inner component 19 could be alternatively constructed with an outer surface that is non-uniformly tapered, or curved, without departing from the spirit of the present invention (e.g., to yield an inner component that has a generally semi-spherical shape).

As another example, in fluid bearing assembly 11, outer component 17 is designed to function as the rotor whereas inner component 19 is designed to function as the stator. However, it is to be understood that outer and inner components 17 and 19 could be designed to operate in the opposite manner without departing from the spirit of the present invention.

As yet another example, in fluid bearing assembly 11, fluid delivery network 45 and fluid exhaust network 57 are formed into inner component 19. However, it is to be understood that networks 45 and 57 could be alternatively formed into outer component 17 without departing from the spirit of the present invention.

Figure 10:
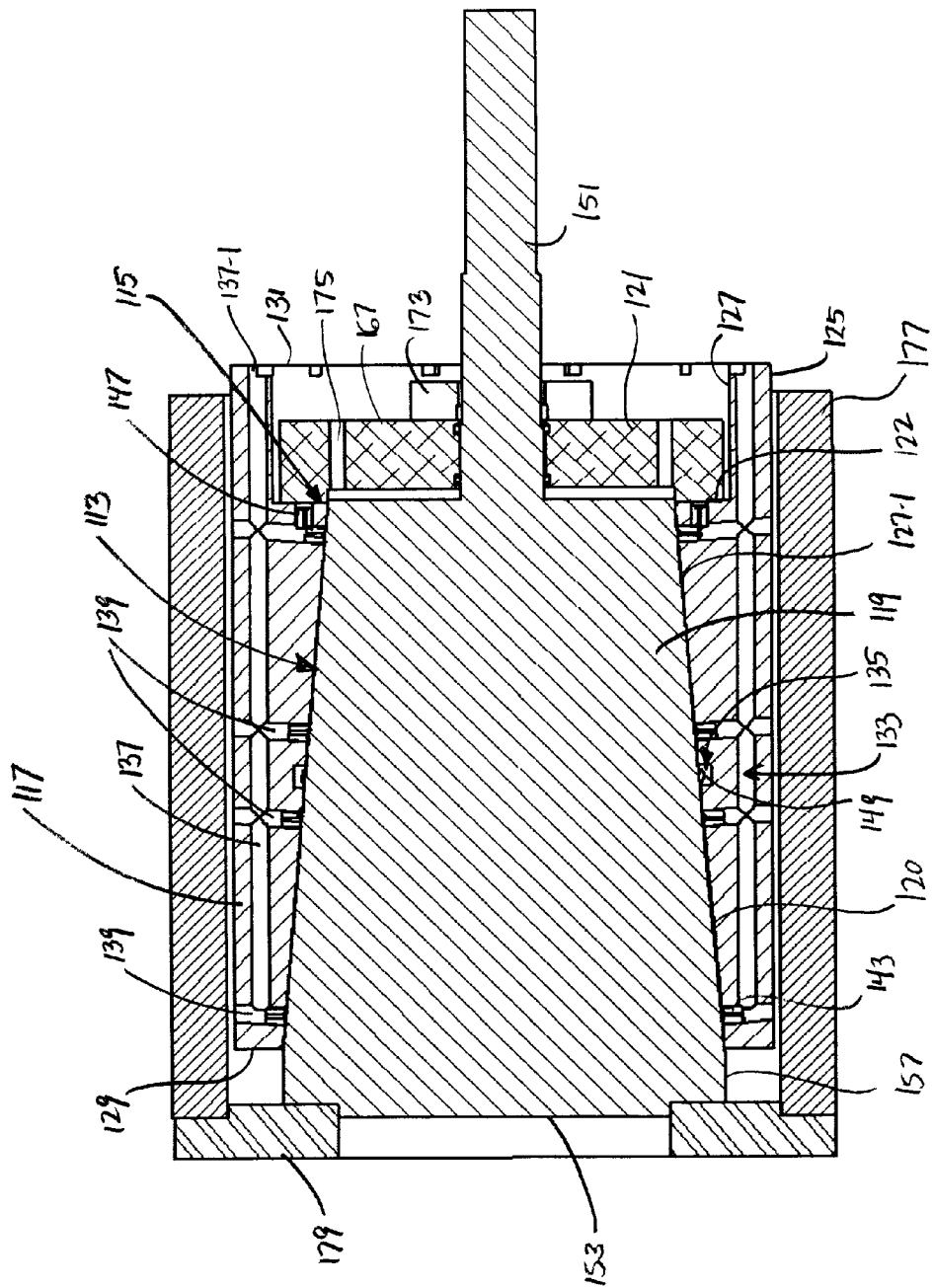
FIG. 10 is a section view of the fluid bearing assembly shown in FIG. 8, taken along lines 10-10, the mounting bracket being shown removed therefrom for clarity purposes.
Figure 13A:
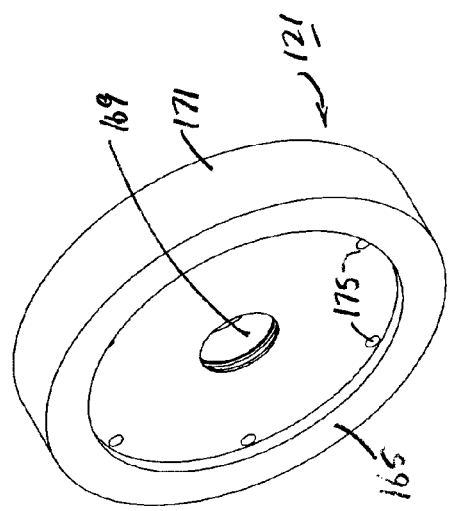
FIGS. 13(a)-(c) are left end perspective, left end and front views, respectively, of the thrust plate shown in FIG. 9.
Figure 13C:
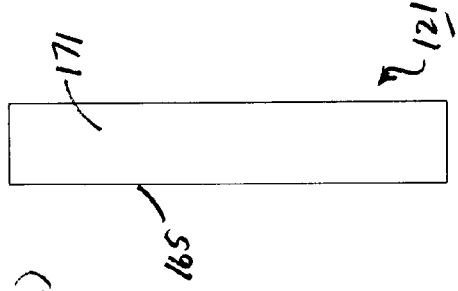
Figure 13B:
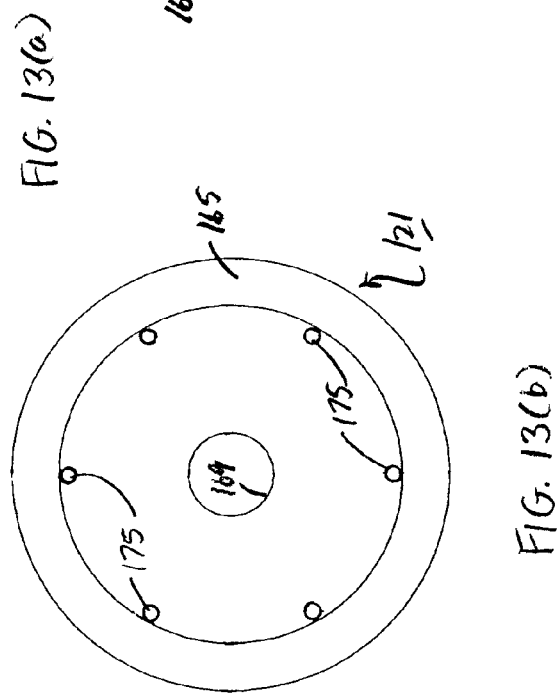

Accordingly, referring now to FIGS. 8-10, there is shown a second embodiment of a fluid bearing assembly that is constructed according to the teachings of the present invention, the fluid bearing assembly being identified generally by reference numeral 111. Fluid bearing assembly 111 is similar to fluid bearing assembly 11 in that fluid bearing assembly 111 comprises a tapered bearing 113 adapted to support radial and axial loads and a thrust bearing 115 adapted to support axial loads. In this manner, thrust bearing 115 can be used to counterbalance, or oppose, the net axial force created from fluid bearing assembly 111 that would ordinarily result in the separation of components.

Fluid bearing assembly 111 is also similar to fluid bearing assembly 11 in that fluid bearing assembly 111 includes a generally cylindrical outer component 117, a generally conical inner component 119 extending coaxially within outer component 117, and an annular thrust plate 121 mounted on inner component 119 and extending in a generally orthogonal relationship relative thereto. As such, outer component 117 and inner component 119 together operate as tapered bearing 113 upon receiving a thin fluid layer in an air gap 120 defined between mating surfaces, air gap 120 being preferably maintained with a spacing range of approximately 2 to 20 microns. Similarly, outer component 117 and thrust plate 121 together operate as thrust bearing 115 upon receiving a thin fluid layer in an air gap 122 defined between mating surfaces, air gap 122 being preferably maintained with a spacing range of approximately 10 to 50 microns.

As seen most clearly in FIGS. 9, 10 and 11(a)-(c), outer component 117 is similar to outer component 17 in that outer component 117 is constructed a generally cylindrical drum that includes a rounded outer surface 125, a multi-faced inner surface 127, an open first end 129 and an open second end 131. However, outer component 117 differs from outer component 17 in that outer component 117, rather than inner component 119, is drilled or otherwise formed to include both an internal fluid delivery network 133 and an internal fluid exhaust network 135.

As seen most clearly in FIG. 10, seen, fluid delivery network 133 includes a plurality of longitudinal fluid channels 137 that are internally formed into second end 131, channels 137 being arranged in a generally circular configuration with fixed angular separation between adjacent channels 137. Each channel 137 includes a keyed inlet, or port, 137-1 at its junction with second end 131 that is adapted to mate with the complementary member of a fluid source (not shown).

In addition, a plurality of spaced apart, radial branches 139 extend through component 117 so as to transect each channel 137, branches 139 being arranged circumferentially around the entirety of component 117. A plug (not shown) is inserted into each branch 139 along outer surface 125 to prevent passage of fluid therethrough. Preferably, a restrictor 143 is disposed in each radial branch 139 and lies flush against a conical, or tapered, section 127-1 of inner surface 127 to restrict the flow of fluid therethrough.

Furthermore, a plurality of longitudinal branches 145 is formed into an annular orthogonal section 127-2 of inner surface 127, as seen most clearly in FIGS. 11(a) and 11(c), branches 145 being arranged in a generally circular configuration with fixed angular separation between adjacent branches 145. Each branch 145 extends in communication with a corresponding branch 139 in order to deliver air to thrust bearing 115. In turn, a restrictor 147 is disposed in each longitudinal branch 145 and lies flush against annular section 127-2. Accordingly, it is to be understood that fluid delivery network 133 is designed to supply fluid not only tapered bearing 113 but also thrust bearing 115.

As seen most clearly in FIG. 10, fluid exhaust network 135 includes a circumferential exhaust groove 149, generally rectangular in cross-section, that is formed into tapered section 127-1 at the approximate midpoint between first end 129 and second end 131. A plurality of longitudinally extending exhaust channels 151 is drilled or otherwise formed into second end 131 of outer component 117. In addition, a radial exhaust channel 152 is drilled transversely through component 117 so as to transect each longitudinal exhaust channel 151 and, in turn, extend into fluid communication with groove 149. In this capacity, pressurized air within air gap 120 can be released to ambient conditions through both the opening of each longitudinal channel 151 at second end 131 and the opening of each radial channel 152 at outer surface 125.

As seen most clearly in FIGS. 10 and 12(a)-(c), inner component 119 is similar to inner component 19 in that inner component 119 is constructed as single conical member that includes a first end 153, a second end 155 and a tapered outer surface 157. Because networks 133 and 135 are formed into outer component 117, inner component 119 is constructed as a solid member.

As seen most clearly in FIGS. 10 and 13(a)-(c), thrust plate 121 is similar in design and function to thrust plate 21 in that thrust plate 121 is constructed as a unitary, annular member that includes a flat top surface 165, a flat bottom surface 167, an inner surface 169 and an outer surface 171. Thrust plate 121 is axially mounted on second end 151 of inner component 119 and is retained thereon by a threaded nut 173.

A plurality of longitudinal exhaust channels 175 is drilled or otherwise formed into thrust plate 121, each channel 175 extending in fluid communication with air gap 122 for thrust bearing 115. As a result, pressurized air within air gap 122 for thrust bearing 115 can be exhausted to ambient conditions.

Referring now to FIGS. 9 and 10, fluid bearing assembly 111 further differs from fluid bearing assembly 11 in that fluid bearing assembly 111 additionally includes an external, cylindrical rotating component, or roller, 177 that is axially disposed over outer component 117 in a spaced apart relationship relative thereto.

In addition, an annular end plate 179 is provided to fixedly secure inner component 119 to roller 177. Specifically, fasteners (not shown) are driven through an inner ring of transverse bores 181 formed in end plate 179 and an aligned array of bores 183 formed into first end 153 of inner component 119. Similarly, fasteners (not shown) are driven through an outer ring of transverse bores 185 formed in end plate 179 and an aligned array of bores 187 formed into roller 177.

Accordingly, by connecting second end 155 of inner component 119 to a motor (not shown), the motor-driven rotation of inner component 119 can be used to rotably drive roller 177. In contrast to outer component 17 in bearing assembly 11, outer component 117 is secured to a mounting bracket, or collar, 189 and therefore serves as the stator for bearing assembly 111. As such, outer component 117 is designed to support the bearing surfaces for assembly 111, to support the networks of delivery and exhaust channels for bearings 113 and 115 and, in addition, to serve as the component through which bearing assembly 111 is fixedly mounted onto a system structure.

In a similar capacity to fluid bearing assembly 11, the performance characteristics for fluid bearing assembly 111, such as its load capacity and stiffness, are largely determined by the geometric properties of the principal components (i.e., the angle and surface area of gap defining surfaces), the inner diameter of restrictors 143 and 147, and the initial spacing of air gaps 120 and 122. However, as a principal feature of the present invention, the performance characteristics for fluid bearing assembly 111 can be acutely modified by simply adjusting threaded nut 173, thereby eliminating the need for a remake of the entire bearing assembly 111 when alternative performance characteristics are required.

What is claimed is:

1. A fluid bearing assembly, comprising:
   (a) an outer component having a main longitudinal axis, the outer component being shaped to define an interior cavity;
   (b) an inner component disposed within the interior cavity and extending in a coaxial relationship relative to the outer component, the inner and outer components together defining a first air gap; and
   (c) a thrust plate axially coupled to the inner component, the thrust plate and the outer component together defining a second air gap, the thrust plate being adapted to be axially displaced along the inner component and retained at multiple fixed positions relative thereto in order to modify the size of the second air gap;
   (d) wherein each of the first and second air gaps is adapted to receive a fluid, the delivery of the fluid into the first air gap creating a tapered fluid bearing between the inner and outer components, the delivery of the fluid into the second air gap creating a fluid thrust bearing between the thrust plate and the outer component.

2. The fluid bearing assembly as claimed in claim 1 wherein the axial force created between the inner and outer components from the delivery of the fluid into the tapered fluid bearing is counterbalanced by the axial force created between the inner and outer components from the delivery of the fluid into the fluid thrust bearing.

3. The fluid bearing assembly as claimed in claim 2 wherein the first air gap is defined by at most one pair of opposing tapered surfaces.

4. The fluid bearing assembly as claimed in claim 2 wherein the outer component includes a first end, a second end, an inner surface and an outer surface.

5. The fluid bearing assembly as claimed in claim 4 wherein the inner surface of the outer component includes a tapered portion and an annular, radial portion.

6. The fluid bearing assembly as claimed in claim 5 wherein the tapered portion extends at an angle relative to the longitudinal axis that falls within the range of 0.5 degrees and 10 degrees.

7. The fluid bearing assembly as claimed in claim 5 wherein the annular, radial portion lies generally orthogonal to the longitudinal axis.

8. The fluid bearing assembly as claimed in claim 5 wherein the inner component includes a first end, a second end and a tapered outer surface.

9. The fluid bearing assembly as claimed in claim 8 wherein the tapered outer surface of the inner component and the tapered portion of the inner surface of the outer component define the first air gap.

10. The fluid bearing assembly as claimed in claim 9 wherein the inner component is generally in the shape of a single conical member.

11. The fluid bearing assembly as claimed in claim 9 wherein the thrust plate is an annular member that is axially mounted on the inner component, the thrust plate comprising a flat top surface, a bottom surface, an inner surface and an outer surface.

12. The fluid bearing assembly as claimed in claim 11 wherein the flat top surface of the thrust plate and the annular, radial portion of the inner surface of the outer component define the second air gap.

13. The fluid bearing assembly as claimed in claim 12 wherein the flat top surface of the thrust plate lies generally orthogonal to the longitudinal axis.

14. The fluid bearing assembly as claimed in claim 12 wherein the thrust plate is retained on the inner component by a fastener that is axially mounted on the inner component.

15. The fluid bearing assembly as claimed in claim 12 wherein a fluid delivery network in communication with the first air gap is formed into at least one of the inner and outer components.

16. The fluid bearing assembly as claimed in claim 2 wherein a fluid delivery network in communication with the second air gap is formed into at least one of the thrust plate and the outer component.

17. The fluid bearing assembly as claimed in claim 2 further comprising a hollow, cylindrical roller axially disposed over the outer component in a spaced apart relationship relative thereto, the roller being fixedly coupled to the inner component.

18. A fluid bearing assembly, comprising:
(a) an outer component having a first end, a second end, an inner surface, an outer surface and a main longitudinal axis, the inner surface of the outer component including a tapered portion and an annular, radial portion, the outer component being shaped to define an interior cavity;
(b) an inner component disposed within the interior cavity and extending in a coaxial relationship relative to the outer component, the inner component including a first end, a second end and a tapered outer surface, wherein the tapered outer surface of the inner component and the tapered portion of the inner surface of the outer component together define a first air gap; and
(c) an annular thrust plate axially mounted on the inner component, the thrust plate comprising a flat top surface, a bottom surface, an inner surface and an outer surface, wherein the flat top surface of the thrust plate and the annular, radial portion of the inner surface of the outer component together define a second air gap, wherein the thrust plate can be axially displaced along the inner component to modify the size of the second air gap, the thrust plate being retained on the inner component by a fastener that is axially, mounted on the inner component, with a washer axially mounted on the inner component between the bottom surface of the thrust plate and the fastener;
(d) wherein each of the first and second air gaps is adapted to receive a fluid, the delivery of the fluid into the first air gap creating a tapered fluid bearing between the inner and outer components, the delivery of the fluid into the second air gap creating a fluid thrust bearing between the thrust plate and the outer component, wherein the axial force created between the inner and outer components from the delivery of the fluid into the tapered fluid bearing is counterbalanced by the axial force created between the inner and outer components from the delivery of the fluid into the fluid thrust bearing.

19. The fluid bearing assembly as claimed in claim 18 wherein the fastener is threadingly mounted on a stem formed on the inner component, with axial displacement of the thrust plate along the inner component being achieved through rotational adjustment of the fastener along the stem.

* * * * *